US010621243B1

United States Patent
Garrett et al.

(10) Patent No.: US 10,621,243 B1
(45) Date of Patent: *Apr. 14, 2020

(54) IN-CONVERSATION SEARCH

(71) Applicant: Google LLC, Mountain View, CA (US)

(72) Inventors: Maryam Garrett, Boston, MA (US); Richard A. Miner, Boston, MA (US)

(73) Assignee: Google LLC, Mountain View, CA (US)

( * ) Notice: Subject to any disclaimer, the term of this patent is extended or adjusted under 35 U.S.C. 154(b) by 665 days.

This patent is subject to a terminal disclaimer.

(21) Appl. No.: 15/340,020

(22) Filed: Nov. 1, 2016

Related U.S. Application Data

(63) Continuation of application No. 14/684,744, filed on Apr. 13, 2015, now Pat. No. 9,514,227, which is a continuation of application No. 12/398,297, filed on Mar. 5, 2009, now Pat. No. 9,031,216.

(51) Int. Cl.
| | | |
|---|---|---|
| *G06F 7/00* | (2006.01) | |
| *G06F 17/30* | (2006.01) | |
| *G06F 16/951* | (2019.01) | |
| *G10L 15/08* | (2006.01) | |
| *G10L 15/22* | (2006.01) | |
| *G10L 15/30* | (2013.01) | |
| *G10L 13/08* | (2013.01) | |
| *G10L 15/26* | (2006.01) | |
| *H04L 12/58* | (2006.01) | |

(52) U.S. Cl.
CPC ............ *G06F 16/951* (2019.01); *G10L 13/08* (2013.01); *G10L 15/08* (2013.01); *G10L 15/22* (2013.01); *G10L 15/26* (2013.01); *G10L 15/30* (2013.01); *H04L 51/04* (2013.01); *H04L 51/18* (2013.01); *G10L 2015/088* (2013.01); *G10L 2015/223* (2013.01)

(58) Field of Classification Search
CPC ....... G06F 16/951; G10L 15/08; G10L 13/08; G10L 15/22; G10L 15/26; G10L 15/30; H04L 51/04; H04L 51/18
See application file for complete search history.

(56) References Cited

U.S. PATENT DOCUMENTS

| | | | |
|---|---|---|---|
| 7,590,699 | B2 | 9/2009 | Natarajan et al. |
| 7,624,416 | B1 | 11/2009 | Vandermolen et al. |
| 7,856,469 | B2 | 12/2010 | Chen et al. |
| 8,121,997 | B2 | 2/2012 | Raciborski |
| 8,140,563 | B2 | 3/2012 | Midgley |

(Continued)

FOREIGN PATENT DOCUMENTS

EP 2634709 9/2013

*Primary Examiner* — Azam M Cheema
(74) *Attorney, Agent, or Firm* — Honigman LLP; Brett A. Krueger

(57) ABSTRACT

A computer-implemented communications method is discussed. The method includes receiving a typed user input in a texting conversation on an electronic communication channel between two or more users of electronic communications devices; analyzing the user input to identify whether the user input contains a reserved word for triggering a search; submitting a search query received in association with the reserved word to a search engine, if the user input contains a reserved word; receiving one or more search results from the search engine; and providing, in the electronic communication channel for incorporation into the texting conversation, at least one of the one or more search results.

17 Claims, 11 Drawing Sheets

(56) References Cited

U.S. PATENT DOCUMENTS

| | | |
|---|---|---|
| 8,145,659 B1 | 3/2012 | Smith et al. |
| 8,335,829 B1 | 12/2012 | Jablokov |
| 8,392,392 B1 | 3/2013 | Ruf |
| 9,031,216 B1 * | 5/2015 | Kamvar ............ G06F 16/951 379/202.01 |
| 9,514,227 B1 * | 12/2016 | Garrett ............ G06F 16/951 |
| 2002/0059192 A1 | 5/2002 | Ling |
| 2004/0024751 A1 | 2/2004 | Petrisor et al. |
| 2005/0075884 A1 * | 4/2005 | Badt, Jr. ............ G06F 3/167 704/275 |
| 2005/0234883 A1 | 10/2005 | Szeto et al. |
| 2006/0294189 A1 | 12/2006 | Natarajan et al. |
| 2007/0130276 A1 | 6/2007 | Zhang et al. |
| 2007/0201637 A1 | 8/2007 | Brown et al. |
| 2007/0255795 A1 | 11/2007 | Wang et al. |
| 2008/0076402 A1 * | 3/2008 | Jeong ............ G06Q 30/02 455/422.1 |
| 2008/0084976 A1 | 4/2008 | Brackmann |
| 2008/0086384 A1 | 4/2008 | Srinivasan et al. |
| 2008/0201304 A1 | 8/2008 | Sue |
| 2008/0201434 A1 | 8/2008 | Holmes et al. |
| 2009/0055388 A1 | 2/2009 | Song |
| 2009/0070318 A1 | 3/2009 | Song |
| 2009/0232288 A1 | 9/2009 | Forbes |
| 2010/0085222 A1 * | 4/2010 | Kataoka ............ H03M 7/40 341/65 |
| 2013/0308499 A1 | 11/2013 | Hodge |

* cited by examiner

IN-CONVERSATION SEARCH

CROSS-REFERENCE TO RELATED APPLICATIONS

This application is a continuation application of and claims priority to U.S. application Ser. No. 14/684,744, filed on Apr. 13, 2015, which is a continuation of and claims priority to U.S. application Ser. No. 12/398,297, filed Mar. 5, 2009, the entire contents of each are hereby incorporated by reference.

TECHNICAL FIELD

This document relates to user interfaces for obtaining search results, such as search results delivered in the middle of a text or voice conversation between two users of a computing system.

BACKGROUND

More and more, people use computers to communicate. Electronic mail permits communication in an asynchronous manner, meaning that two parties need not be present at the same time to communicate. Other communication is synchronous, such as telephone calls made using VOIP technology, text messaging, and chat applications. Generally, this synchronous communication occurs as a voice or text conversation between or among two or more people. During such conversations, any of a number of topics may be discussed. For example, friends may discuss the latest sporting events or may plan social events, while business colleagues may discuss the performance of companies or news in their particular industry.

SUMMARY

This document describes systems and techniques that may be used to provide search results to participants in an electronic conversation. For example, two people may be conversing over a telephone call, such as a call carried over a VOIP connection, and may reach a point where they would like to obtain information that might be available via the internet. One of the users may speak a reserved keyword to trigger a search application, and then may speak one or more search terms. The keyword may cause a component that is following the call, such as a module running on a client device used by one of the call participants, to submit the search terms to a search engine and to return results received from the search engine over the voice connection of the telephone call. In a similar manner, a person participating in an on-line chat session may provide an entry that includes a triggering keyword and one or more search terms. A search result may then be returned into the chat session in a manner that it can be seen by the submitting user or all of the users.

For example, during a discussion between friends, a dispute may arise over which Chicago Bears players entered the Professional Football Hall of Fame during its inaugural year in 1963. One of the participants may state: "query [pause] Pro Football Hall of Fame Class of 1963 From Chicago," where "query" is a reserved term that is used to indicate the intent to have a search performed. The participants may then hear read, over the telephone connection, "Red Grange, George Halas, Bronko Nagurski," if the receiving search engine were able to generate such a precise response to the search request. The system may also preface the search results with other information to indicate that the system properly understood the query, such as starting with the phrase "Chicago Bears Players from the 1963 Hall of Fame Induction Class." The participants may then continue with their discussion, thus avoiding embarrassment to any participant who had maintained that Bronko Nagurski was not an inaugural member of the Hall of Fame. Follow-up options may also be provided to the users, such as a list of multiple possible queries where the query provided by a user was ambiguous to the system, or information from various sources. For example, a user may choose, after obtaining search results, to have an encyclopedic entry of information on the same topic read to them.

In a like manner, business associates may be discussing potential investments in a chat room, so that one participant may wonder the price of stock for a chip maker, and may type "query: cypress." Such a request may be ambiguous to a system in that it could represent Cypress Semiconductor or Cypress Bioscience. As a result, the system could respond, in line with the chat conversation, "enter CY for Cypress Semiconductor; enter CYPB for Cypress Bioscience." Upon the user typing CY, the system may respond, in line with the chat, "Cypress Semiconductor, current 157.50, open 155.25, high 160.25, low, 155.25, change+2.25." Such user reaction may also be used to help disambiguate later searches, such as by determining that later searches are likely to involve requests for stock market information, or information about electronics topics rather than biotechnology-related topics.

Also, the literal results of a prior search may be used to disambiguate subsequent searches. For example, in the Chicago Bears example above, a user may voice the follow-up query "Bronko Nagurski birthdate." Ordinarily, the system might have trouble interpreting the verbal statement "Bronko Nagurski," but the immediate preceding presence of the term in the search results may be used to tilt the system's voice recognition in the direction of the term, and to thus improve the voice recognition of the system.

Provisions may also be provided to permit participants in conversations to control the security of such conversations. For example, the monitoring described here may be performed by a client-side process so that only search terms (and not the main part of a private conversation) are sent to a remote service. Also, remote systems may monitor a conversation passively so that no part of the conversation—aside from the intended search queries—is shared. For example, monitoring may be in a streaming mode, where no information from the normal conversation is stored for more than the short time needed to identify a reserved term in the conversation. Also, sound from a conversation may be hashed on a client device before being sent to a remote server, so that the remote server can only determine whether part of the sound matches a predetermined reserved term, but cannot otherwise determine the content of any other information in the confirmation, until the system senses a reserved word and changes into an active mode to receive search terms. In addition, when a system moves from a passive monitoring mode into a mode in which it is collecting input for submission as a search query, it may explicitly announce itself to the human participants in a conversation, and give the participants a chance to opt out of, or disable, the monitoring functionality.

Certain follow-up activities may also occur from a search result in addition to refining a search and being taken to a landing page for a search result. As one example, participants in a conversation may be conferenced into a communication with a subject of a search result. For example, two participants to a telephone call may be discussing where to have dinner, and one of them may voice the command "query, thai food new york city" and may receive in response a result of "Topaz Thai Restaurant, one twenty-seven west fifty-sixth street." The user may say "next" for another result that is close to them, and then may voice the command "call," which may cause the restaurant to be dialed into the call as a conference call, using a connection service like that provide by GOOGLE's GOOG411 service. The search results may be in the form of local search, where the locality selected by the system may be a location of whichever user is currently providing a location, or a location somewhere between the two users (under the inference that they can meet in the middle).

In one example, a computer-implemented communications method is disclosed. The method comprises receiving, at a computing device, a typed user input in a texting conversation on an electronic communication channel between two or more users of electronic communications devices. The method further comprises analyzing the user input to identify whether the user input contains a reserved term for triggering a search, automatically submitting to a search engine a search query received in association with the reserved term, if the user input contains a reserved term, receiving one or more search results from the search engine, and automatically providing, in the electronic communication channel for incorporation into the texting conversation, at least one of the one or more search results. The reserved term can comprise a name of a search service. The user input can be received and analyzed, and the search query can be submitted, by one of the electronic communication devices. Also, the one or more search results can be provided along with a handle that identifies the results as coming from a search service corresponding to the handle.

In some aspects, the method further comprises formatting the one or more search results to reduce an amount of information to be provided on the communication channel to a level that is less than an amount of information provided by the search engine. The method can also comprises receiving a user command to dial a telephone number corresponding to one of the search results, and in response, automatically conferencing a destination of the telephone number with the communication channel so that the two or more users may converse with a person at the destination for the telephone number.

In yet other aspects, the method includes formatting the submitted search query to match an application programming interface for a public search engine so as to communicate with an existing search engine without a need to modify the search engine to respond to the query. Moreover, the method can include announcing, in response to identifying a reserved term, into the electronic communication channel, a presence of a monitoring service, to warn the users that communications through the electronic communication channel are being recorded.

In another implementation, computer-implemented communications method is disclosed that comprises electronically monitoring a conversation on an electronic communication channel between two or more users of communication devices and identifying, with a computer system, a reserved term in the conversation and identifying a query corresponding to the reserved term, submitting the query to a search engine with the computer system. The method also comprises receiving a response to the query from the search engine, and automatically inserting onto the electronic communication channel information corresponding to the response. The monitoring can comprise passive monitoring that discards information from the conversation as it is received, until a reserved term is identified, and discards information from the conversation as it is received after a query corresponding to the received reserved word is submitted. Also, the method can include providing one or more user-selectable controls with the response, wherein the user selection of the one or more controls results in additional information being automatically inserted onto the electronic communication channel.

In some aspects, the user-selectable control comprises a control that, when invoked by one of the users, causes a telephone number corresponding to the response to be dialed automatically and conferenced into the conversation. In addition, the method can comprise receiving a user command to dial a telephone number corresponding to the response, and automatically conferencing a destination of the telephone number with the communication channel so that the two or more users may converse with a person at the telephone number destination.

In yet another implementation, a computer-implemented data entry system is discussed that comprises a communication device to mediate, at least in part, an electronic communication channel carrying a conversation between a plurality of users of electronic communication clients. The system also includes a electronic monitor, associated with the communication device, and configured to monitor the content of the electronic conversation for a user indication of an intent to insert a search request into the conversation. Moreover, the system includes an interface to a search engine, wherein the interface is configured to format a search request submitted in the conversation into a format appropriate for the search engine, to format a result from the search engine into a format appropriate for introduction into the conversation, and to provide the result into the electronic communication channel. The communication device can comprise a mobile client device that includes the electronic monitor and interface. Also, the electronic monitor can be configured to discard information from the conversation until it senses a reserved word, and to then save a determined quantity of content from the conversation after sensing the reserved word, wherein at least a portion of the determined quantity of information is submitted to the search engine.

In some aspects, the monitor is configured to compared hashed information from the conversation to a hashed version of the reserved term in order to determine whether a reserved term has been submitted in the conversation. Also, the search engine can be a publicly available search engine, and the interface can be configured to format the search request to match an API for the search engine. Moreover, the interface can include a speech-to-text converter for formatting the search request, and a text-to-speech converter for formatting the result.

In another implementation, a computer-implemented communication system is disclosed that comprises a communication device to mediate, at least in part, an electronic conversation between a plurality of users of electronic communication clients; an electronic monitor, associated with the communication device, and configured to monitor the content of a the electronic conversation for a user indication of an intent to insert a search request into the conversation; and means for providing search results intro the communication link that joins the plurality of communicating users so that each of the plurality of communicating users obtain the search result as part of the conversation.

The details of one or more embodiments are set forth in the accompanying drawings and the description below.

Other features and advantages will be apparent from the description and drawings, and from the claims.

DESCRIPTION OF DRAWINGS

Like reference symbols in the various drawings indicate like elements.

DETAILED DESCRIPTION

Figure 1A:
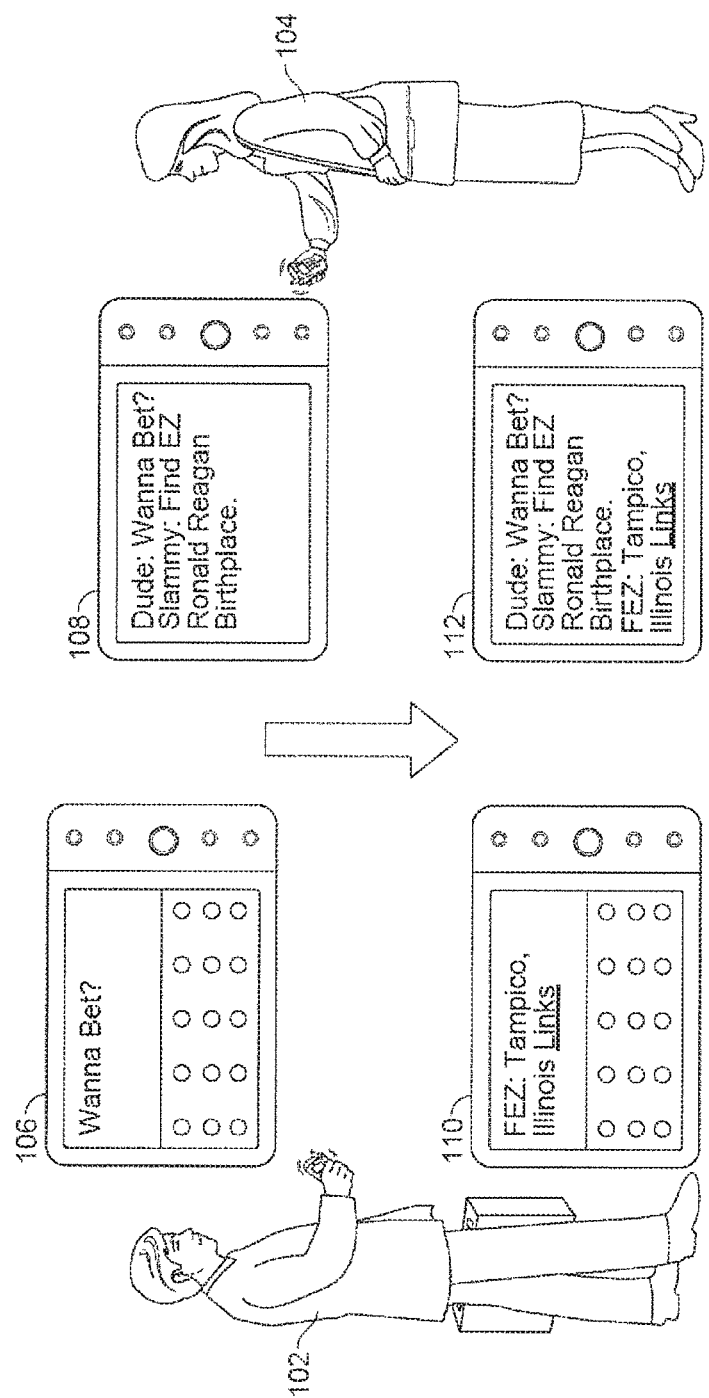
FIGS. 1A and 1B show example use cases for an in-line conversation search process and system.

This document describes systems and techniques for providing search results as part of a conversation between two users of electronic communications devices, such as desktop or laptop computers, cellular telephones or smartphones, and other such devices. A conversation in this context is a communication that occurs between two or more people. The conversation may take a variety of forms, such as a spoken conversation over a regular or VOIP telephone connection, or textual messaging such as chat, text messaging, or similar technologies.

In particular implementations, one participant in a conversation may provide an indication that they would like to obtain information form a network-connected service, such as a standard internet search engine. They may begin to do so, for example, by stating (either verbally or typing) a reserved word or keyword, which is generally a word or phrase that will not be spoken by participants to a conversation unless they are interested in such a search service. The keyword or reserved word may be, for example, the name of the particular search service, where that name is not a common term in the relevant language of the participants. Invoking the reserved term may activate the system by causing the system to accept follow-up submissions by the user as being search-related submissions, such as by applying the subsequent submissions as search strings to a search engine. Where the conversation is verbal, a speech-to-text conversion may be employed.

The system may then receive a search result, which may be in a form such as that provided by a ONEBOX result, where a single main search result is provided by the search engine, and that result compiles what is determined to be the most relevant information for the search query from the participant. For example, when users submit the term "weather" along with a geographic descriptor (e.g., "San Francisco" or a zip code), the search engine may return (in addition to links for various weather-related web sites) information that provides the 3-day forecast for the stated geographic area. The in-conversational search system may then parse and format such information into a form determined to be proper for presentation as part of the conversation. For instance, in the weather example, graphical images may be ignored, the forecast information may be arranged linearly, and additional information may be added, such as prefix information ("The 3-day weather for Fertile, Minn. is . . . ") and suffix information ("Say 1 if you want more information, say 2 if you meant Fertile, Pa . . . "). Such information may also be inserted into the conversation, such as by the system taking on the personality of a third participant and speaking (for telephone conversations) or typing (for text conversations) the information.

In this manner, the described systems and techniques may provide relevant search functionality to users while they are conversing, without requiring them to turn to an alternative communication device or computing application. In addition, such results may be provided so that both participants can perceive it, so that one participant need not relay the results to the other participant. In this manner, the users may be provided with relevant information in a timely manner, as soon as a query is raised by the topic of their conversation, and the system can provide them with answers before they move on with their conversation, with a very small amount of interruption of the conversation.

Figure 1B:
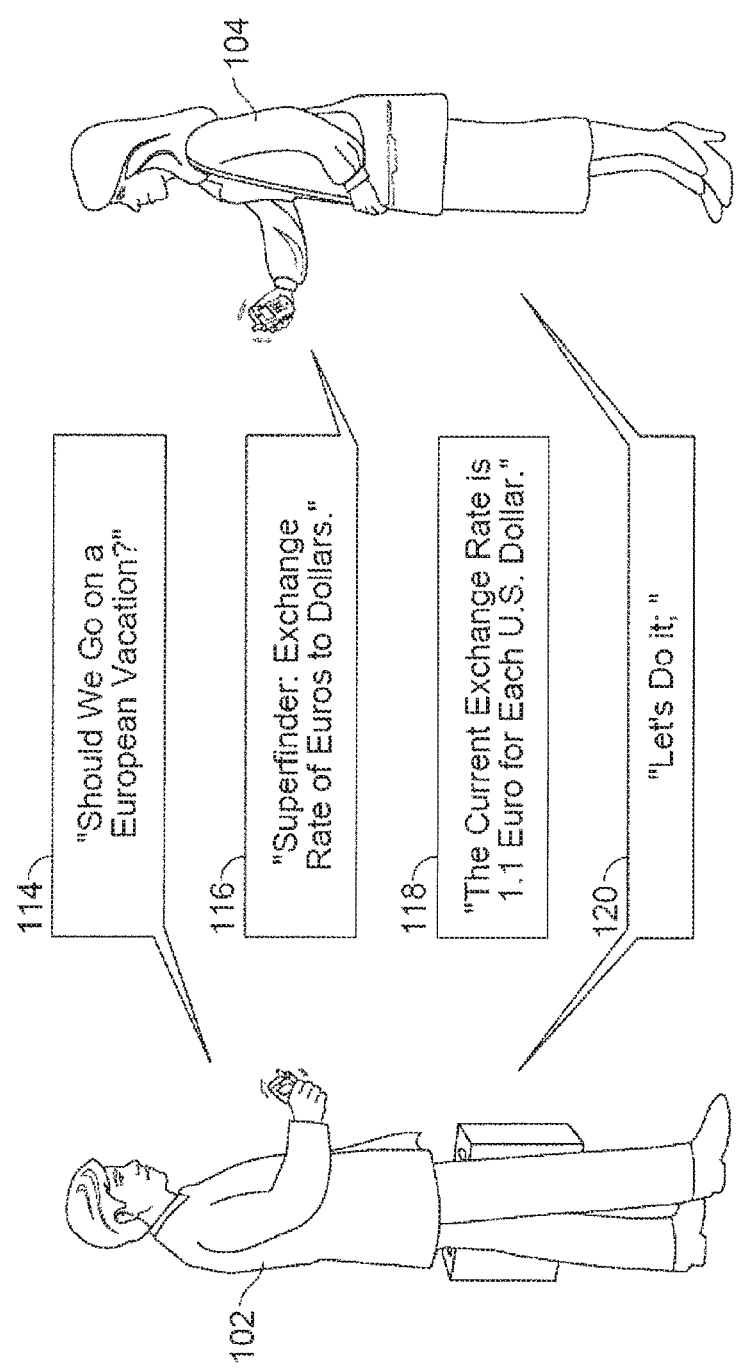

FIGS. 1A and 1B show example use cases for an in-line conversation search process and system. In the use case shown in FIG. 1A, two users 102, 104 are conversing verbally on a telephone call. Such a call could also include additional users also.

Cartoon voice bubbles show a snippet of the conversation that involves use of an in-line search service. Bubble 114 shows user 102 asking user 104 whether she thinks they should plan a European vacation. User 104 in this example is a bargain hunter and wants to make sure that such a trip would be wise economically. As a result, at box 116, she elicits the help of a search service named Superfinder by first voicing the name of that service. Such a word is a good term for invoking the service because it is very unlikely that anyone will state the word "superfinder" unless they truly intend to invoke such a service. As a result, the service will not be invoked accidentally in normal conversation.

User 104 then immediately states her query at box 116. The reserved word and the query will have entered into the conversation, so that user 102 will also hear them. The query can take a defined (e.g., Boolean) form or a more natural language form, much as regular search queries can be provided directly to a standard internet-connection search engine. In fact, as described more fully below, in certain implementations, the search functionality may be provided by a standard search engine, where a front-end system is provided to interact with conversations and to format search queries, to submit those properly formatted queries to the search engine (essentially as if it was a normal user of the search engine) using a published application programming interface, to receive responses back to from the search engine, and provide the responses to the participants in the conversation. With such a system, a pre-existing search engine that provides traditional web search results can be used with an in-conversation search interface, without needing to modify the search engine.

Box 118 shows the search result as presented by the system. In particular, in this example, the system uses a synthesized voice that is inserted into the conversation so that user 102 and user 104 both immediately hear the result. Here, the result is the current currency conversion rate from the U.S. dollar to the Euro. The conversion rate is relative good in the users' views, so at box 120, they both confirm to each other that they should plan the trip.

Upon delivering the result, the in-conversation search interface could again go dormant until the next time one of the users speaks the word "Superfinder." Alternatively, the interface may stay active for a predetermined time period or until a command is received from one of the users to stop active monitoring of the conversation for additional requests from the users.

Thus, as shown here, the users 102, 104 ran themselves into a situation in which they needed some information that was available, but that they did not have. They could have stopped the conversation so that one user could get an answer, and then picked up the conversation later. Or one of them could have volunteered to check his or her computer or pull his or her telephone away from their face, open a browser and/or a search box, enter the search term, get and interpret the results, and then read the results back to the other user. Instead, they were able to get the results quickly and together.

Although not shown, other follow-up conversation may occur in the pictured scenario. For example, one of the users could state "Superfinder: coach airfares from San Franciso to Paris around March 5." The service could then respond with some of the better located airfares provided by a travel site, with the results reformatted for efficient delivery over a telephone conversation. For example, the service may parse a grid of airfares and only read to the users 102, 104 the airline, the date, and the price. Each entry may also be accompanied by an ID number, so that one of the users 102, 104 make subsequently speak the relevant number to get detailed information for that flight.

Generic commands may also be permitted with the service. For example, the users can state "forward" and "back" to move through results. As one example, a user can state "back" after they have been read information about a particular flight, to return to the "page" that presented multiple possible flights as search results. The user could state "repeat" to have the current "page" or result read back to them. In this manner, the user can navigate through multiple possible search results.

Follow-up connections may also be made for the conversation, much in the manner that telephone connections are made with the GOOG 411 service. In particular, one of users 102, 104 may state "dial" or "call it" after selecting a search result, which may cause a telephone number associated with the search result (or another contact ID, such as an e-mail or text message address) to be dialed, and the recipient of the call to be conferenced into the conversation. In this manner, the users 102, 104 may obtain even more information on a topic together. Such an approach may be particularly useful for local search, where a group can be conversing, ask for a search on a particular type of restaurant, identify a particular restaurant as a search result, and cal the restaurant together on a conference call to make reservations or ask questions.

Also, appropriate mechanisms may be used to push helpful additional content out to the users in a conversation. For example, if the user are conversing on a verbal chat service, the system may be able to identify them via prior log in information, and may thus be able to show them map information for a restaurant (e.g., by sending them each an e-mail containing the map, by adding the map to a personalized home page for each user where the users may each have their browsers always pointed to the home page, or by pushing the data to another application on a mobile device held by each user, which may then be cause to alert each respective user of its presence and to display the map information).

Also, confirmation of the presence of the service may be provided so that users 102, 104 may know when the service is actively monitoring and may turn off such monitoring. For example, the reserved word in box 116 and the query may be separated into two parts. Specifically, the user may first state "Superfinder" and wait. The service may then announce itself, such as by stating, "Superfinder on duty," and one of the users 102, 104 may then speak a query. Also, the service may confirm the query, by converting the user's speech into text and then synthesizing what the service "heard" from the user. The service may be arranged so that it is not listening to the conversation (other than listening passively, to confirm the presence of the reserved trigger word "Superfinder") at any other time.

The service may also provide additional feedback to a user. For example, if a search does not return results that are determined to be adequate in quality (e.g., a search service may provide such a quality number to an in-conversation front-end to assist in this process) or that cannot easily be translating into speech or a text message format, the service may state as much to the user and suggest other queries, or may ask the user to resubmit the query. Also, where no simplified result such as a ONEBOX result is available for a query, the service may ask for additional information or may provide raw search result snippets or other such information.

FIG. 1B shows a use case similar to that in FIG. 1A, but where the conversation is a typed conversation in the form of a chat conversation. Again, the conversation participants are users 102 and 104, who in this example may be stuck in meetings or other public places, and thus cannot have a spoken conversation. In the example, they are having a conversation on their touchscreen smartphones, where different displays of the smartphones are pictured to show the flow of the conversation from top to bottom. The device of user 102 in this example has an on screen keyboard, and thus less space to show message information, while the device of user 104 uses coded touch on the screen as a data input mechanism (e.g., where swipes in particular locations and directions on the screen indicate certain alpha-numeric characters).

Display 106 shows user 102 getting excited by a comment from user 104 that user 102 perceives to be inaccurate. As a result, user 102 (whose screen name is "Dude") asks user 104 (whose screen name is "Slammy") if she'd like to place a wager on the point. User 104 confirms her intent to wager by typing a message back to user 102 that begins with a reserved term "Findez," the name of another in-conversation search service. (The service may be the same as the service in FIG. 1A; different names were used here simply to provide additional examples for how such service may be triggered.) Apparently, the users 102 and 104 are interested in mid-1980's politics, as they want to know where Ronald Reagan was born.

Although in the context of the conversation, the query from user 104 was directed to user 102, so that user 102 will see it, it is also sensed by an application running on the device of user 104 that is programmed to stand by until it sees the term Findez, to parse out the remainder of any such message, to submit the remainder to a predetermined search engine (either with or without editing of the query to make it more suitable for submission, and more likely to generate a response that is suitable for presentation in a texting conversation). Such an application may be part of the chat client for user 104 or may be a plug-in for such a client. The application may also be server based, and part of the overall chat system. The application may then receive search results back from the search engine in a familiar manner, and may then present the results in a properly formatted manner. The persona presenting the results may be the application itself (here, denoted by the screen name "FEZ") or may be the persona of user 2, so that the application simply auto-types an additional message for user 2. As shown in the figure, the result is displayed essentially simultaneously to both users 102, 104.

A "links" hyperlink is also displayed with the short, formatted result. Such a link may be selected by one of the users, and may cause their device to launch web browsers that show various ordinary search results for the query, where the results include a snippet from a web site and a link to the site. In this manner, the users 102 or 104 may individually or collectively determine to follow up and gain more information about the topic of the search. For example, user 102 may doubt the search results, and may want to confirm that the displayed result is really Ronald Reagan's birthplace, and not Nancy Regan's birthplace erroneously extracted from a web page that included information on both individuals, and improperly correlated with The Gipper.

The subsequent activity of the users 102 and 104 may also be automatically coordinated. For example, if user 104 selects the "links" hyperlink, browser applications on both users' devices may launch, and manipulation by user 104 of her browser may be substantially immediately reflected in the browser of user 102. In this additional manner, the information gathering experience of the users 102 and 104 may be enriched, and may occur in a coordinated manner so that the users may further expand their conversation (e.g., by next determining the state in which a swimming rabbit allegedly chased Jimmy Carter in a boat.)

As with the first example, a user may also be provided with a control to contact an entity associated with a search result for real-time conversation. For example, screens for the user 102, 104 may display controls labeled "text" or "dial" that, when selected, may cause the users 102, 104 to be connected via typed or telephone conversation with such a third-party entity. For example, if a search result corresponds to a facility, such as a restaurant or museum, selection of the control by one of the users may cause that user or both users to have a telephony application on their devices activated, and the one or both of them may be connected via a telephone call to the topic of the search result.

These two scenarios or use cases provide limited examples of beneficial uses that can be made of the systems and techniques described more fully throughout this document. Specifically, users can conveniently obtain information and have that information presented democratically and immediately to the group as a whole. They can also follow up on the information that is provided to them to learn even more about a topic. Thus, the systems and techniques described here may be particular responsive to spontaneous questions that arise as part of a group telecommunications session. In addition, the systems and technique may have advantages for information providers in that they can increase the number of users and situations that they serve, and to advertisers that operate through the information providers, as they may be able to better target their promotional materials to spontaneous—and thus particular strong, though fleeting—interests of users of communications devices.

Figure 2A:
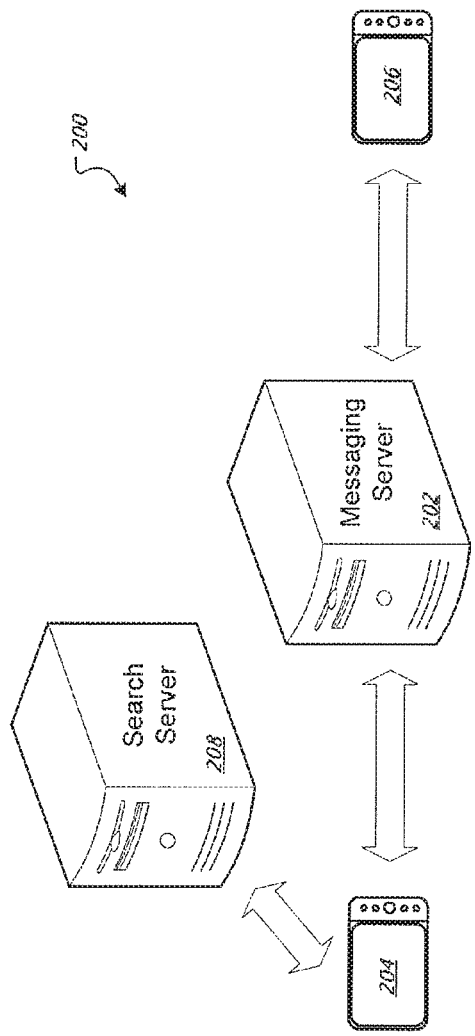
FIG. 2A is a schematic diagram of a system for performing in-line search for typed conversations.

FIG. 2A is a schematic diagram of a system 200 for performing in-line search for typed conversations. In general, the system 200 provides for submission of search queries during the course of an internet chat session, with search results provided back into the stream of the chat session. In the illustrated example, such functionality may be implemented simply by adding an application or module to a chat client device, without having to modify either a search server system or the chat server system that hosts the chat session. The client device may sense the presence of in-conversation search requests and may format the requests and any results according to an application programming interface for the particular search engine that is being used.

As illustrated, two client devices 204, 206 are communicating via a messaging server 202. Such an arrangement may take a typical form, where each client device is provided with a chat client application, and the server 202 mediates communications between and among such clients. Although only a single server and a pair of clients are shown here for simplicity and clarity, the server 202 may be represented in actual implementation by multiple servers cooperating in a larger system of servers. Also, a whole group of clients may be involved in a chat conversation, such as when a group of school friends are conversing or a user is broadcasting a monologue such as via a microblogging service.

A search server 208 is provided external to the chat sub-system to provide search functionality in-line with the typed conversation that runs through the messaging server 202. The search server 208 may be or include servers that exist wholly apart from the chat system, such as an internet search engine system that can be accessed via a variety of routes, include from a search home page such as www.google.com. In this example, the search server 208 communicates directly with client 204. Such communication may be governed by an API published by the operator of the search server 208, so that a programmer of a in-line search application on client device 204 may understand how queries submitted to the search server 208 need to be formatted, and how search results received in return from the search server will be formatted (and thus, how such results need to be reformatted before being inserted into the conversation between device 204 and device 206).

In operation then, a user of device 204 may address a chat message to a user of device 206, such as after seeing that the user of device 206 is active and on-line. The two parties may then converse back and forth, and perhaps with other users in the same chat room or similar area, and each comment typed in by a user in the group will be displayed to the group in a familiar manner that is known to users of typical chat messaging services. At some point, one user (such as the user of device 204) may decide that the group needs information that they do not yet know.

When such a determination is made, the user may take actions to invoke such in-line or in-conversation search functionality, where the system had, to that point, been monitoring activity passively, such as by looking at text as it passes through and then discarding it essentially immediately unless an appropriate reserved term appears in the text. The user may, for example, type in a special word, or reserved term, to indicate such an intent to have the system 200 take information from the conversation and hold it at least long enough to form a search query from it. The presence of such a term may be sensed by the application running on device 204, which may then capture text input on device 204 or by other participants in the conversation, and may stop gathering such information upon the occurrence of a predetermined event, such as at the end of a line of text entry. When the application determines that the user has finished entering a query, it may reformat the query and submit it in an appropriate form to search server 208. The search server 208 may then return a search result, and the application on client 204 may extract text from the search result and may generate an automatic entry in the chat conversation.

Although shown as a client-side implementation, the in-line search functionality described here may also be implemented on messaging server 202. In such an implementation, an application or module running on a processor of the messaging server 202 may monitor a chat session, waiting for the occurrence of a reserved word. The server 202 may dispose of any data until such a term is identified. Once the term is identified, the server 202 may capture further text entry by the same user or by another user in appropriate circumstances, may format the entered text into information of a form adequate to be processed by the search server 208, and may receive search results or portions of search results in response. The server 202, may then format and edit the received results and insert them into the conversation, such as by adopting a system handle for the chat session, where the handle is chosen to make plain to the other participants that the information is coming from the system and not from another user.

Figure 2B:
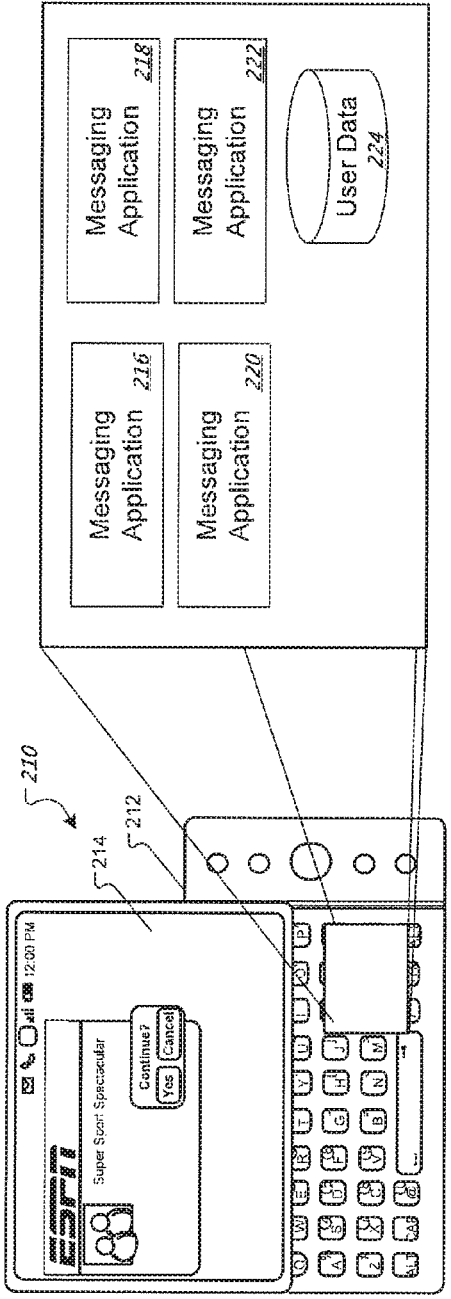
FIG. 2B is a block diagram of a system for augmenting a typed conversation with search results.

FIG. 2B is a block diagram of a system 210 for augmenting a typed conversation with search results. In general, in this example, the system 210 is mainly embodied in a client-side arrangement of cooperating applications that are programmed to operate on a common processor of a mobile device, and to identify information, submit search queries, and received and provide search results in a manner that is compatible with existing chat and search systems. Such components may be provided, for example on devices 204 and/or 206 of the system 200 shown in FIG. 2A. Other arrangements may also be appropriate depending on the particular implementation.

In the figure, a portable device 212, such as a smart phone or other form of portable computing and communication device, is provided with a graphical user interface display 214, by which a user may see information including text from conversations, and may also input information such as text for a conversation. Various components operating on device 212 may provide for in-line search functionality. For example, a wireless interface 218 provides for the device 212 to connect to various data transmission resources, such as a cellular data network that is connected to the internet, and a voice-based communication network that enables a user of device 212 to make telephone calls. Such telephone connections may be completed in a variety of manners, including by way of a VOIP connection between users.

Two example applications are shown here that use the wireless interface 218 to communicate over a network. First, a telephony application 222 allows a user of device 212 to make and receive telephone calls in a familiar manner. Second, a messaging application 216 permits the user to engage in chat or other text-based conversations, such as conversations through chat rooms or by instant messaging.

An in-conversation search module 220 is provided to cooperate with messaging application 216 and telephony application 222. The in-conversation search module 220 provide text-based and audible search results as part of conversations entered into by a user of device 212. For example, when a user is employing a telephony application 222, the user may provide an indication that they would like to have their conversation monitored passively for the occurrence of a reserved word. In-conversation search module 220 may have previously stored data relating to that reserved word, such as a sound profile of the word, to match against information received during a conversation that uses telephony application 222. The telephony application 222 may then pass sound information to the in-conversation search module 220 as a conversation occurs, so that the module 220 may determine when the reserved word has been employed by a participant in the conversation. In a similar manner, the messaging application 216 may pass terms that are being typed into a chat room or other messaging area to the in-conversation search module 220 to determine when a reserved term has been used.

Upon receiving an indication of a reserved term (which may be made up of a single word or multiple words) being used, in-conversation search module 220 may then begin storing subsequent information received from one or more users, under the assumption that the subsequent information will relate to a query that the one or more users would like to submit to a search engine. (The module 220 may also announce its presence into the conversation so that the participants to the conversation know that they should either speak a command to put the module back to sleep, or that their next words will become the subject of a search query.)

When the in-conversation search module 220 is monitoring activity of the telephony application, the input from users may typically be verbal. As a result, the in-conversation search module 220 may need to convert sound information received from the telephony application 222 into text. Such conversion may occur in a familiar manner by a speech-to-text conversion module on device 212, or by a submission of a sound file or similar data by search module 220 to a remote server, which may convert the speech to text, and return the text for subsequent use by the search module 220.

When the in-conversation search module 220 has obtained the relevant query, it may package it for submission to a remote search engine, may receive responses to the query, and may provide one or more of the responses back into the telephone call or the chat room, or to another appropriate communication system. In general, queries that are suitable for use with such a system are queries that are capable of obtaining a formatted search result such as a ONEBOX result, rather than queries that simply provide particular web pages or snippets from web pages as search results. That is because the formatted results compress what is determined to be the most relevant information into a smaller amount of data. In particular, the formatted results take information from a third-party source separate from the search engine and format the information into a special form that presents the particular information in a format particularly chosen for that type of information. Some examples of formatted results include stock quotes in response to a query of a ticker symbol, weather forecast results in response to a query containing a trigger term and geographic location, television listings in response to a program name and time, movie showings in response to a movie title and explicit or implied location, product prices at various retailers in response to a name of a product, and music or musical lyrics in response to the name of a song, group, or album. Thus, by using such formatted results, the amount of spoken text in a telephone conversation or typed text in a chat conversation, coming from search module 220 may be minimized.

Finally, user data 224 may be employed to store particular information about the user of device 212. For example, profile information about the user's voice may be stored in a manner like that employed for popular voice recognition programs, so as to improve recognition levels of the voice of a user of device 212. In addition, identities of a favorite search engine, and a preferred messaging provider may also be stored for the user.

Using the structures above, a client application may be added to a system, such as by a single user who prefers improved operations of chat and telephone conversations. The user and other users with whom that first user communicates may be provided with the benefits of such improved systems. In certain implementations, most or all of the additional functionality may be implemented by way of a client-side solution, so that existing messaging and search systems may be used and provided with the functionality discussed here, without requiring any more substantial modifications of the systems.

Figure 2C:
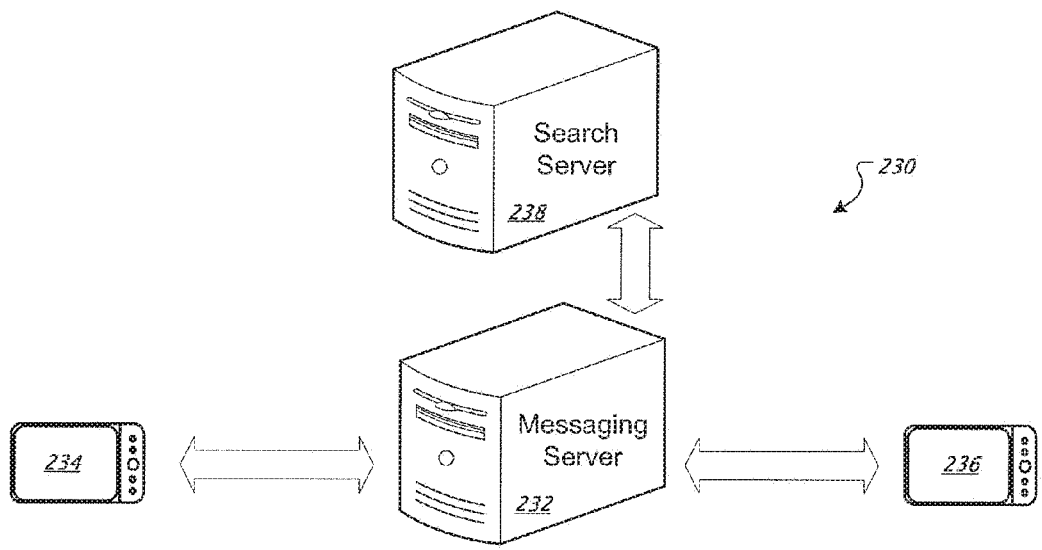
FIG. 2C is a schematic diagram of a system for performing in-line search for telephone conversations.

FIG. 2C is a schematic diagram of a system for performing in-line search for telephone conversations. In general, the system shown here is similar to the system shown in FIG. 2A, but the in-conversation search is provided in relation to verbal conversations held as part of a telephone call, rather than typed conversations. Also, the search handling is provided by a server 232 rather than by a client-side application.

Again, two or more user devices 234, 236 are shown, and in this example the devices 234, 236 are carrying a telephone call between their respective users, as connected by a voice server 232. The voice server 232 may take a variety of forms, and may include routing and switching functionality like that provided by typical VOIP providers. In this illustrative example, the voice server 232 may also passively monitor calls between user device 234 and user device 236 when the users choose to permit such monitoring. The monitoring may be passive in that little or no information from the call is kept in any form after it passes through the system, except for when a user employs a key word or reserved term so as to have subsequent query information stored and submitted to a search engine or other appropriate mechanism.

In the figure, a connection is shown between voice server 232 and search server 238, to represent a submission of a search query by the voice server 238 (either by the server itself or another computing device in a broader server system) to the search server 238, and the subsequent return of search results to the voice server 232. Such functionality may be carried out by the voice server 232 having a voice-to-text converter that obtains spoken input after a reserved term has been spoken, and continuing until a pause of a sufficient length in the conversation to indicate that the user has finished entering search query information (or until another keyword, such as "stop" or "submit" or "enter" is sensed). The voice server 232 may then take this saved sound file for the query and may submit it to a generalized speech-to-text converter, which may be trained to be responsive to a number of different user voices. From such a conversion, a text string may be produced by the voice server 232, and may be submitted directly as a search query to search server 238 according to a predetermined API. In a similar manner, textual results returned from the search server 238 to the voice server 232 may be parsed or otherwise formatted into a form that is suitable for verbal delivery, and may then be provided to a text-to-speech converter that can synthesize speech relating to the received search results.

Figure 2D:
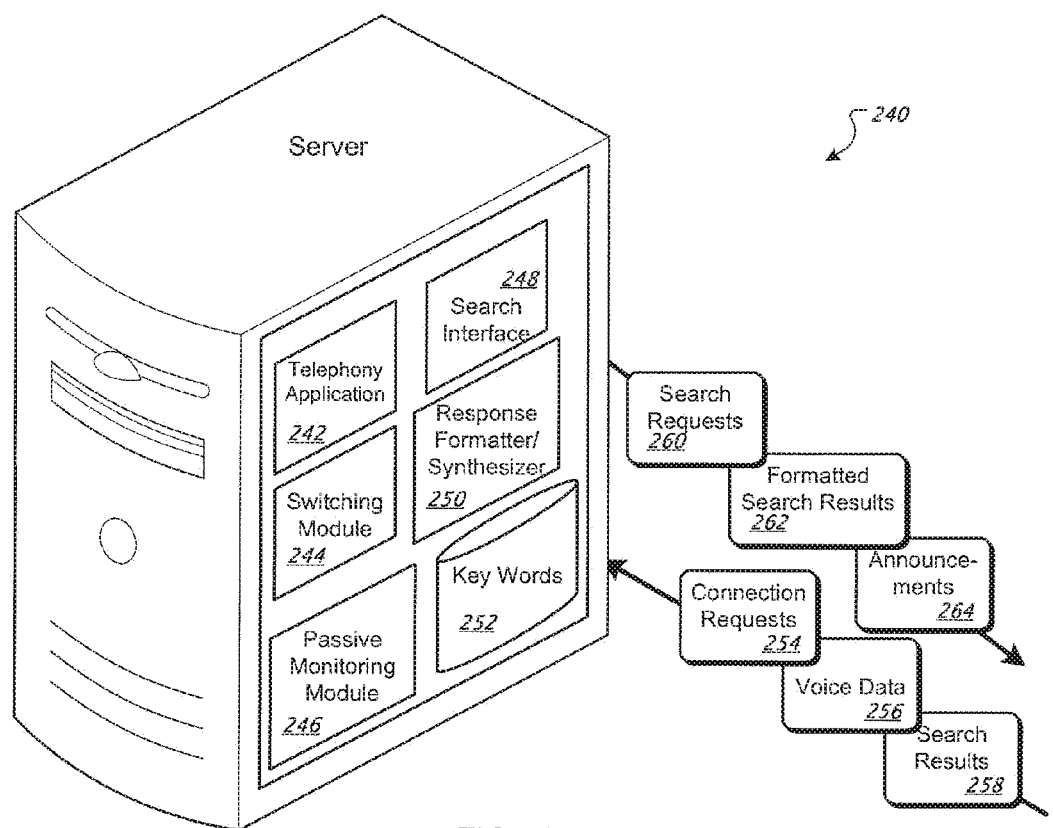
FIG. 2D is a block diagram of a system for augmenting a telephone conversation with search results.

FIG. 2D is a block diagram of a system 240 for augmenting a telephone conversation with search results. A system 240 as shown, may be a subsystem, for example of the larger system shown in FIG. 2C. In particular, the system 240 may generally comprise a server or servers such as voice server 232 shown in FIG. 2C. The server may be one or more physical computer servers, and may be tasked with managing voice-related calls between a number of users of communication devices in a communications network. In addition, the system 240 may assist in the provision of in-line or in-conversation search results to conversations that occur through the assistance of the system 240.

A number of example inputs are shown passing into the server of system 240 to provide examples of information that may be used by the system 240. For example, at box 254, connection requests enter the server and may represent phone numbers or other handles that one or more users submit to the server in order to be connected to another user or users relating to the handles. At box 256, voice data is provided to the server. For examples, where the server is passively monitoring one or more conversations for the presence of reserved terms, the voice data 256 may be streamed into the server as participants in a conversation speak to each other. At box 258, search results are provided to the server. Such search results may be provided in response to a request provided from system 240 to another subsystem that provides search results.

Other information is provided by the server of system 240 to other components in the system. For example, search requests 260 may be formulated by the system 240, and may be exported in the form of HTTP requests to a search engine separate form the server. Also, at box 262, formatted search results are provided by the server. The formatted search results may be formatted for best incorporation in-line with a conversation occurring via the assistance of the system 240. For example, relevant information may be extracted from more general search results, and may be organized in a linear manner so that it may be read into a verbal conversation, or typed into a written conversation.

At box 264, various announcements are provided by the system 240. Such announcements may be used in a variety of manners, but in one example, may be used to provide improved security for users of the system 240. For example, an announcement may be provided by a system any time it is set to do more than simple passive monitoring of a conversation. The system 240 may thus warn participants to a conversation that information in their conversation will be analyzed for more than simply determining whether a reserved term has been spoken or typed. Such an announcement by the system 240 may be accompanied by the ability of the system 240 to accept information in response from participants, so that, for example, a participant may indicate whether they are willing to permit any monitoring of a communication session, and if they are willing to permit monitoring, the level to which such monitoring may occur.

A number of components inside the server of system 240 may operate on a common microprocessor or multiple shared microprocessors and may operate with other subsystems to provide in-line search results in a system. For example, a passive monitoring module 246 may be programmed to look for sound indications that are part of an ongoing user conversation to identify whether a key word has been spoken during such a conversation. The passive monitoring module 246 may initially be loaded with keywords from keyword data stored 252, and may look only for the presence of such words (which may include one or more words, to form a term) in conversations.

A switching module 244 may include logic for controlling the routing of a telephone call (such as via a VOIP connection) between two users, and a telephony application 242 may be used to complete such connections and to manage communication sessions in a familiar manner.

A search interface 248 cooperates with the telephony application 242 to extract information for user queries. For example, the search interface 248 may be notified by the passive monitoring module 246 when a reserved term has been used, and may begin monitoring spoken terms in the conversation to extract a query spoken by one of the participants to the conversation. A search interface 248, in simple forms, may simply format a textualized version of what was spoken by the user, or may perform additional checking and formatting functions. For example, terms such as articles may be removed from a query if the search engine that is to receive the query does not consider such articles. Also, a query that is made up of oddly connected words may be reworded in a more natural form for submission to a search engine, so as to better ensure that the search results received back from the search engine will maximize the quality of information provided to participants in a conversation. Such reformatting of queries may occur at a client device, at a server system, or by a combination of both.

A response formatter/synthesizer 250 performs operations that are much the inverse of those performed by search interface 248. In particular, the response formatter/synthesizer 250 may receive search results, such as in the form of XML information, and may parse, rearrange, or otherwise affect such results to improve the manner in which the results are presented to a user. In this manner, a group of participants in a conversation my present a query as part of the conversation and may be provided with a result inserted into the same conversation, by placing the response right on the communication channel being used by the participants, as if another participant to the conversation had provided the response.

Figure 3A:
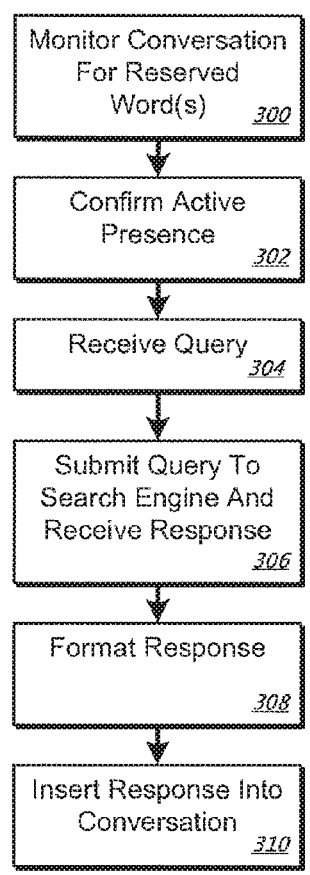
FIG. 3A is a flowchart of a process for providing in-conversation search results.

FIG. 3A is a flowchart of a process for providing in-conversation search results. In general, the process involves monitoring a conversation that occurs over an electronic communication channel such as a chat session or telephone call between two or more individuals, to determine if one of the participants would like to receive search result information. Such an intent by a user may be provided by the user saying or typing a particular word that is intended to trigger an in-conversation search service. The word will generally not be common in normal conversation, so as to not accidentally trigger the service, and may thus be considered a reserved term or key word. The user may then submit a search term, and the process may return search results to the participants of the conversation by placing those results into the communication channel.

The process begins at box 300, where the conversation is monitored for reserved terms. Such monitoring may raise privacy concerns, so the monitoring may be configured to occur on a client device rather than on a server. The process may also maintain privacy by looking at a transformed version of the conversation from which the presence of a reserved word can be determined, but the other content of the conversation may not. Such an effect may be obtained, for example, by hashing the conversation before it is provided to the monitoring components, and making the comparison of the hashed conversation to a hashed version of the reserved word or words. The process will, in effect, "see" the conversation as gibberish, and will be able to identify the presence of a reserved term only because the process already has a version of that term that has been turned into gibberish by the same hashing function. Particular hashing techniques are well known.

At box 302, the active presence of the process is announced by the process to the participants and confirmed by the participants. For example, where the conversation is a telephone conversation, an electronic voice may state, into the communication channel, that an in-line search service is now operable. The announcement may also include instructions to the participants of the conversation, such as instructions that permit the participants to turn off the service and the monitoring entirely, to set the service back to passive monitoring (e.g., because they stated the reserved term accidentally or merely said something that sounded like the reserved term), or to submit a search query such as by annunciating the query and then pausing for a sufficient time period that the process can determine that they have completed entering the query.

In the process as shown, one of the participants to the conversation—which may be the person who spoke the reserved term or another person—has decided that they would like to obtain information, so at box 304, a query is received by the process from that person. If the query is typed (e.g., if the communication channel is a chat session), it may be taken immediately. If the query is spoken, it may be converted to text for further processing. Because speech-to-text conversion is not perfect, particularly when a system has not been trained to a particular user, the process may synthesize the text that it generated for the query and play it back over the communication channel to provide the participants with an opportunity to confirm that the query was properly transcribed, or to resubmit the query (perhaps by a participant who has better diction).

At box 306, the query has been determined by the process to be what the participant intended to submit for processing, and so that query is submitted to a search engine. The particular form or format of the query may be changed before such submission to better match the style of the search engine, so as to increase the likelihood that the search engine will generate a response that can be provided into the communication channel. In particular, summarized results like those provided in ONEBOX search results—such as local movie schedules, current weather and stock quotes, birth and death date of famous individuals—are particular useful for such insertion because they contain only the most relevant information, and that information is in the search result itself, and not on a web page to which the result (which may be in the form of a web page title and snippet) is directed.

The process may be programmed to understand the types of queries that are most likely to result in a summarized result, and may thus reformat submitted queries to provide such a result. For example, certain terms may be eliminated from a query, the words in a query may be reorganized, or terms may be added to a query, such as a prefix that indicates to a search engine the type of information that is desired. For example, a conversation may have involved a linguistic debate over the English word "life." If the query is "meaning of life," the process may reformat the query into a form like "definition: life" so that dictionary definitions of the word, and not philosophical discussions of the concept, are returned.

The process may, in certain circumstances, analyze other content from the conversation to help determine the intended context of the query. In the example above, if the participants had previously been using terms like "dictionary" or "definition," the process may determine that a definition is to be provided in response to the query "meaning of life". In contrast, if the conversation included terms like "deep" and "existentialism," the query may be formatted in a different manner. Such analysis of other parts of the conversation may not be possible, however, where only passive monitoring of the conversation has occurred, so that information from the conversation is discard essentially as it is received by the process. Other contextual information, such as user-specific information (where user have chosen to provide a system with access to user-specific information) may also be used so that, for example, if one user has identified themselves as having a Ph.D in philosophy to a social networking system associated with the in-conversation search system, they may receive a search, not on the definition of "life," but instead on the philosophical foundations of life.

The process also receives a search response or result at box 306. In certain implementations, the search engine may be a search engine that existed before in-conversation search functionality existed, and that can take input via many forms and provide it back in various forms according to a published API. Such an arrangement permits processes like the process described here to be added to the core search service without adding a separate specialized search engine for each such process. In essence, the processes are related by a classic layered architecture, where one layer passes information to the next in a defined form (e.g., one process coverts an in-conversation search request into a textual form that can be submitted to a search engine), but the layers are not concerned with what happens within other layers as long as the information they receive is accurate and properly formatted.

In this example, the response may come back in a format that is particularly suitable for display on a screen, where the content is arrange in two dimensions, and may be accompanied by graphical images. Many communications, however, such as chat sessions and telephone calls, are linear, in that information is scrolled into the conversation one piece at a time, like a ticker tape (though perhaps faster). As a result, various heuristic rules or learning techniques may be used to deconstruct the response and reformat the information from the response into a form that can be presented linearly. Such formatting of the response is shown by box 308.

Finally, at box 310, the response—in its reformatted format—is inserted into the conversation by placing it into the conversation. Where the conversation is in the form of a chat session, the response may be typed into the session just as if it had been typed by a user. Where the functionality shown here is provided by a central server system, a handle for such a system may be shown to indicate where the information is coming from. Where the functionality is provided by a client device of one of the participants in a conversation, the response may be typed automatically and may tied to the on-screen handle of that user, though the information may be preceded by an identifier for the search service, so that the other participants know they are getting the information from a third party and not from their colleague.

Figure 3B:
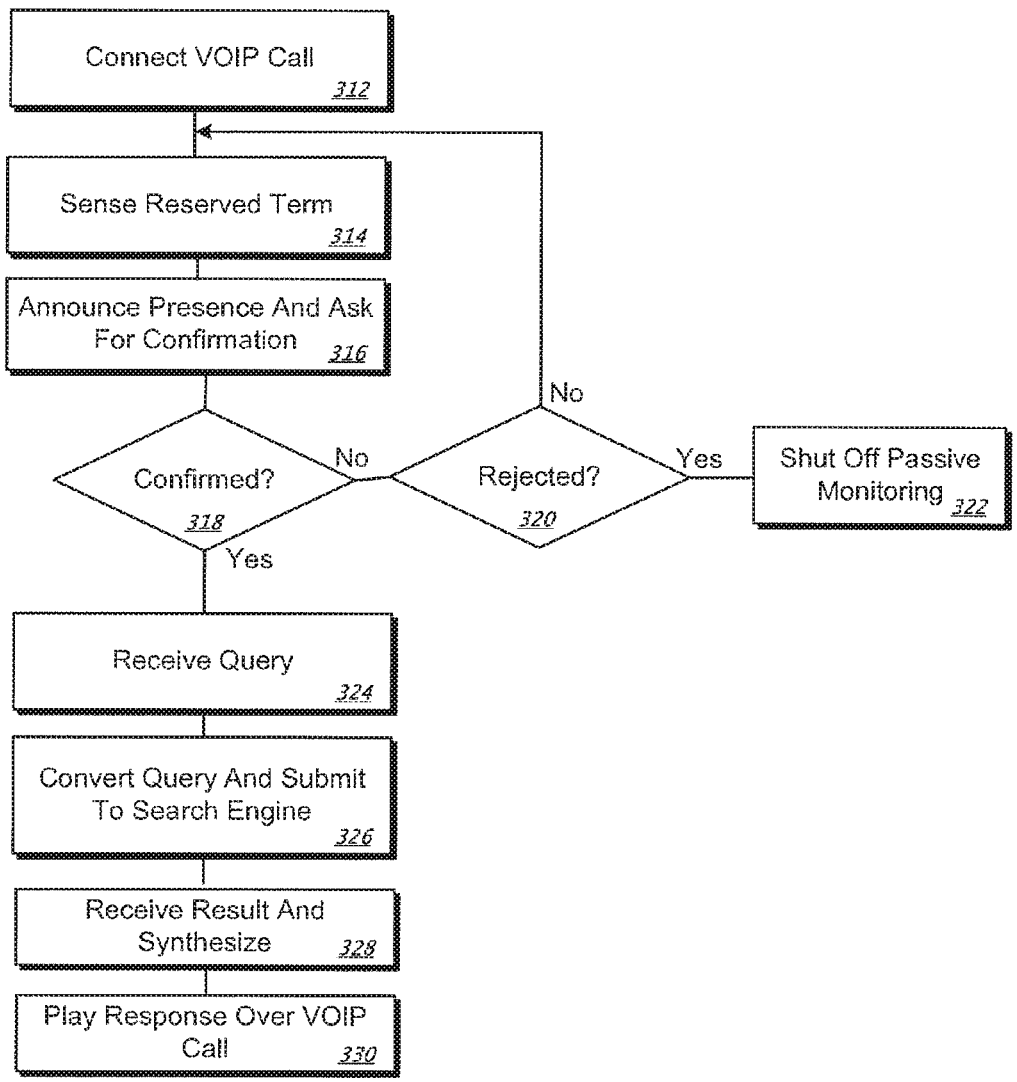
FIG. 3B is a flowchart of a process for providing in-conversation search results to a telephone conversation.

FIG. 3B is a flowchart of a process for providing in-conversation search results to a telephone conversation. In general, the process is similar to that shown in FIG. 3A, though this process is directed more directly to a communication session in the form of a VOIP-connected telephone call, and additional decisional logic is shown to illustrate additional information that may be passed as part of the process. In this example also, the handling of in-conversation search is performed by a central server system, because such a system is more likely to have the processing power that may be needed to analyze spoken conversations, and to convert content from such conversations into text.

The process begins at box 312, where a VOIP call is connected. Such a connection may occur in a familiar manner, and may be done so that a central server may monitor the content of the call in a passive fashion to ensure privacy on the call. Before any such monitoring occurs, the participants may be notified, and their assent to the presence of the service may be confirmed. As the call goes on, the process may monitor the content until a reserved term is sensed at box 314. At this point, the process may transition from a passive state to an active state and may warn the participants that it is doing so by speaking an announcement to the same effect. The process may also seek confirmation from the users that such a change is permitted.

Decision boxes in the figure then show examples of responses that the participants may provide. For example, box 318 indicates whether the participants confirmed that active monitoring, at least for the short time needed to acquire a search query, is permitted. If it is not, the users may either reject the process altogether (box 320) in which case the monitoring is shut off entirely (box 322), or may express an interest in having the monitoring return to a passive state (the "no" arrow off box 320).

If the participants confirm the active presence of the process, then they may submit a query by speaking it (box 324). The process may then convert the query to text, and may also reformat the query, as discussed above and submit the query to a search engine (box 326). At box 328, one or more results may be received back from the search engine, and those results may be reformatted, such as by selecting a representative result and formatting it for a linear presentation. The result may then be converted or synthesized from text to speech, and the synthesized speech may be played into the communication channel by well known mechanisms so that each of the participants can hear the result. In certain situations, the result may be played into the communication channel in a manner so that only a subset of participants hear the result, such as when one user is mediating a conflict between two other users and would like to obtain the true answer to the conflict before letting the other users know.

Figure 4A:
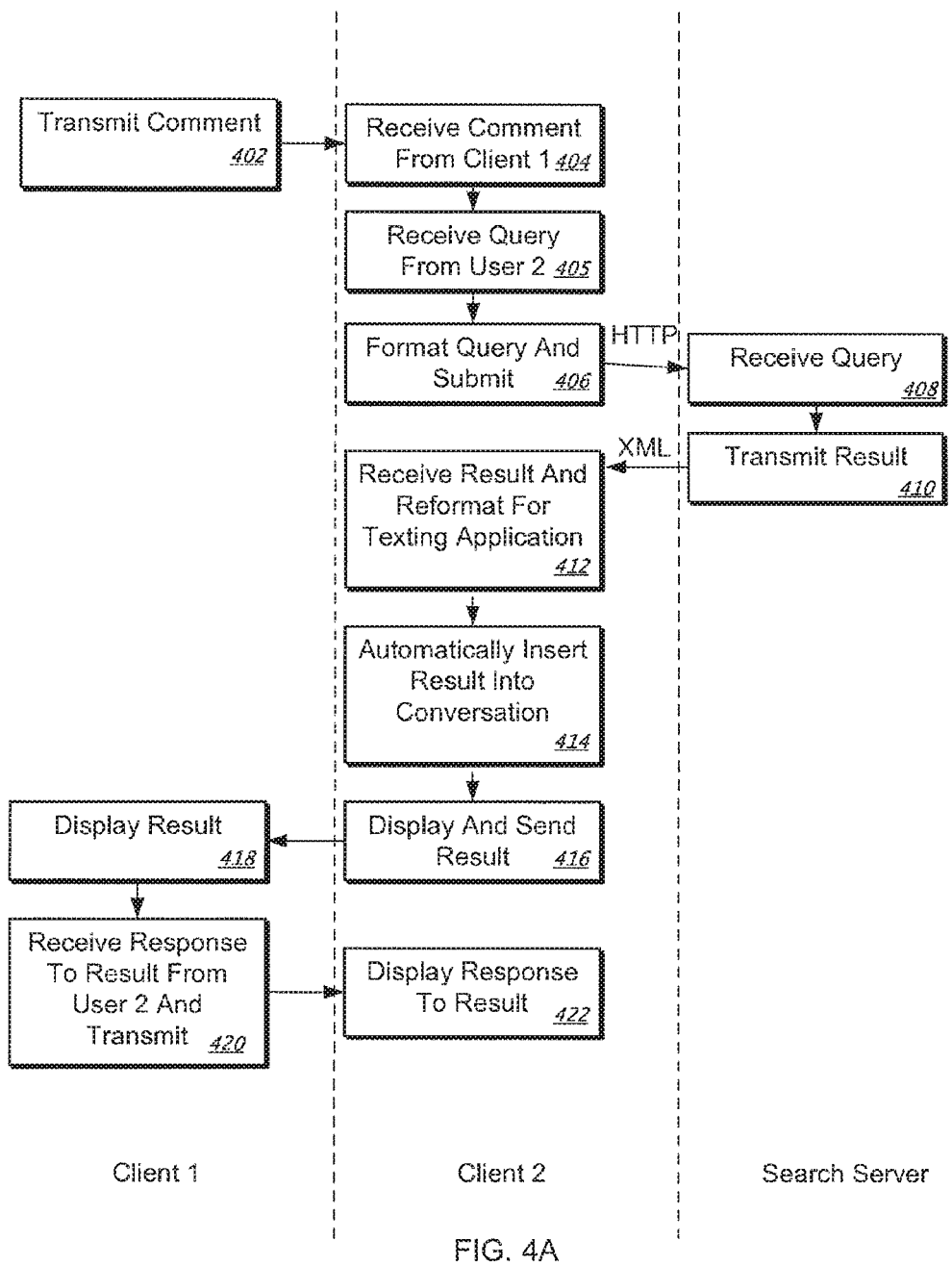
FIG. 4A is a swim lane diagram of a process for providing search results as part of a typed conversation.

FIG. 4A is a swim lane diagram of a process for providing search results as part of a typed conversation. In general, this figure shows a process similar to the process in FIG. 3A, but broken out in more detail to show an example of the particular actions that can be performed by each component of a multi-component system that includes two or more client communication devices over which two or more users are communicating, and a search server separate from the client communication devices. In this example, the in-line search results are provided by one of the clients, here Client 2, working in cooperation with a public search server. Thus, the process shown here could be implemented simply by programming a client application for Client 2, without a need for any explicit coordination with, or work by, the user of Client 1 or the operators of Search Server.

The process begins at box 402, where the user of Client 1 transmits a comment to the user of Client 2. The comment may be any sort of statement that occurs during a communication session. At box 402, Client 2 receives the comment, which in this example spurs curiosity in the user of Client 2. Client 2 thus also receives a query from its user, where the query may be accompanied by a triggering action from the user, such as the provision of a reserved word, or the selection by the user of a control (e.g., an on-screen icon or a particular key or combination of keys on a telephone keypad, such as entering 411 during a call so that the corresponding dial tones played into the call trigger activation of the service) on Client 2 that results in the invocation of in-line search services on Client 2.

At box 406, Client 2 formats the query, which, as discussed above, may simply involve formatting the words of the query into an electronic package that is suitable for presentation to the Search Engine, or may include substantially rewriting the query to improve the likely results delivered in response to the query. Client 2 then submits the query, such as via a standard HTTP transmission and the search engine receives the query in a standard manner at box 408. The Search Engine generates a response in the form of a search result (box 410) that it then transmits back to Client 2, such via an XML or similar transmission.

When Client 2 receives the response, it may again reformat it for the reasons, and via the techniques, described above, or via other appropriate techniques—here for displaying as part of a texting application, such as in a chat room (box 412). At box 414, the result is automatically inserted into the conversation by placing it into the electronic communication channel that connects the participants to the conversation. As noted above, in the chat context, such insertion may be made to look like the information is coming from the user of Client 2, or may be given an entirely different chat handle. Therefore, the result is displayed by Client 2 and sent to each of the other participants at box 416 (such as by sending the result to a chat server that is working with Client 2 and other client devices to mediate the chat session).

The result may then be forwarded to each client, such as Client 1, and displayed on those other clients—essentially at the same time as it is displayed on Client 2 (box 418). The application running on Client 2 (which could alternatively be running on a remote server, or in part on a client and in part on a server) may also be responsive to search related input received from other clients, such as Client 1. Thus, at box 420, Client 1 receives a response to the result from its respective user and transmits the response back over the chat channel to the other participants. The response may include a further and new query, formatted in the same manner as the initial query. Alternatively, the response may involve interaction by the user with the result from the first query. For example, the user may type one of a number of control words to obtain more information. As one example, the user can type "more" if they liked the result but did not believe it to be complete enough. They could type "next" if they thought the first result was not the most relevant result. They could type "jump" to be taken to a web page from which a result was obtained, and a portion of the web page may then be typed automatically into the conversation or a web browser form one or more of the users' client devices may be launched automatically by the process with the web page displayed. Other similar controls may also be used.

Finally, the input at Client 1 is reflected at Client 2, so that all participants in the conversation can keep up. Subsequent interaction between and among the participants may then take place in a familiar manner, and/or additional interaction with the in-conversation system can occur. Thus, the particular interactions shown here may be repeated for other search queries as users seek such interaction, and extensions of the examples shown here may also be employed.

For example, although the particular examples of telephone and chat conversations are not particularly rich, more complex controls may be provided for more complex communication modes. As one example, typed conversation may be accompanied by coordinated content that is shown to viewers, so that as viewers converse that may be shown similar television programs, short videos, or web pages in a coordinated manner. Commands like those above may be used in-line with the conversation to control such coordinated presentation of information. As one illustration, in the example discussed above, a browser area next to a chat area may be presented in response to a query, and users may enter commands in the chat area to control what is shown in the browser area. For example, a list of search results may be displayed, and a user may type "3" in the chat area to have a web page associated with the third result displayed to all of the participants, Such combined presentation of information may provide for a particularly rich, yet coordinated, communication session between users.

Figure 4B:
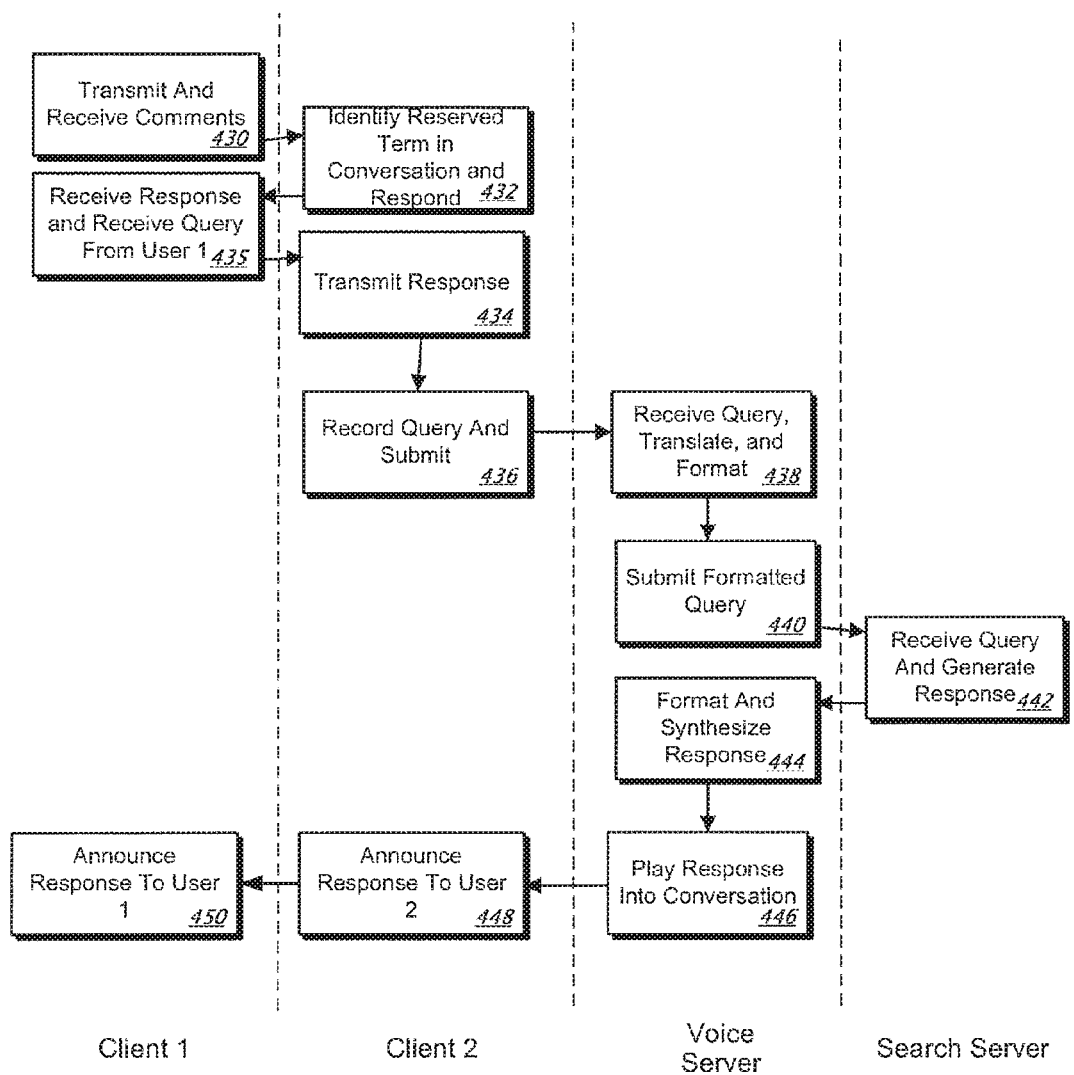
FIGS. 4B and 4C are swim lane diagrams of processes for providing search results as part of spoken electronic conversations.
Figure 4C:
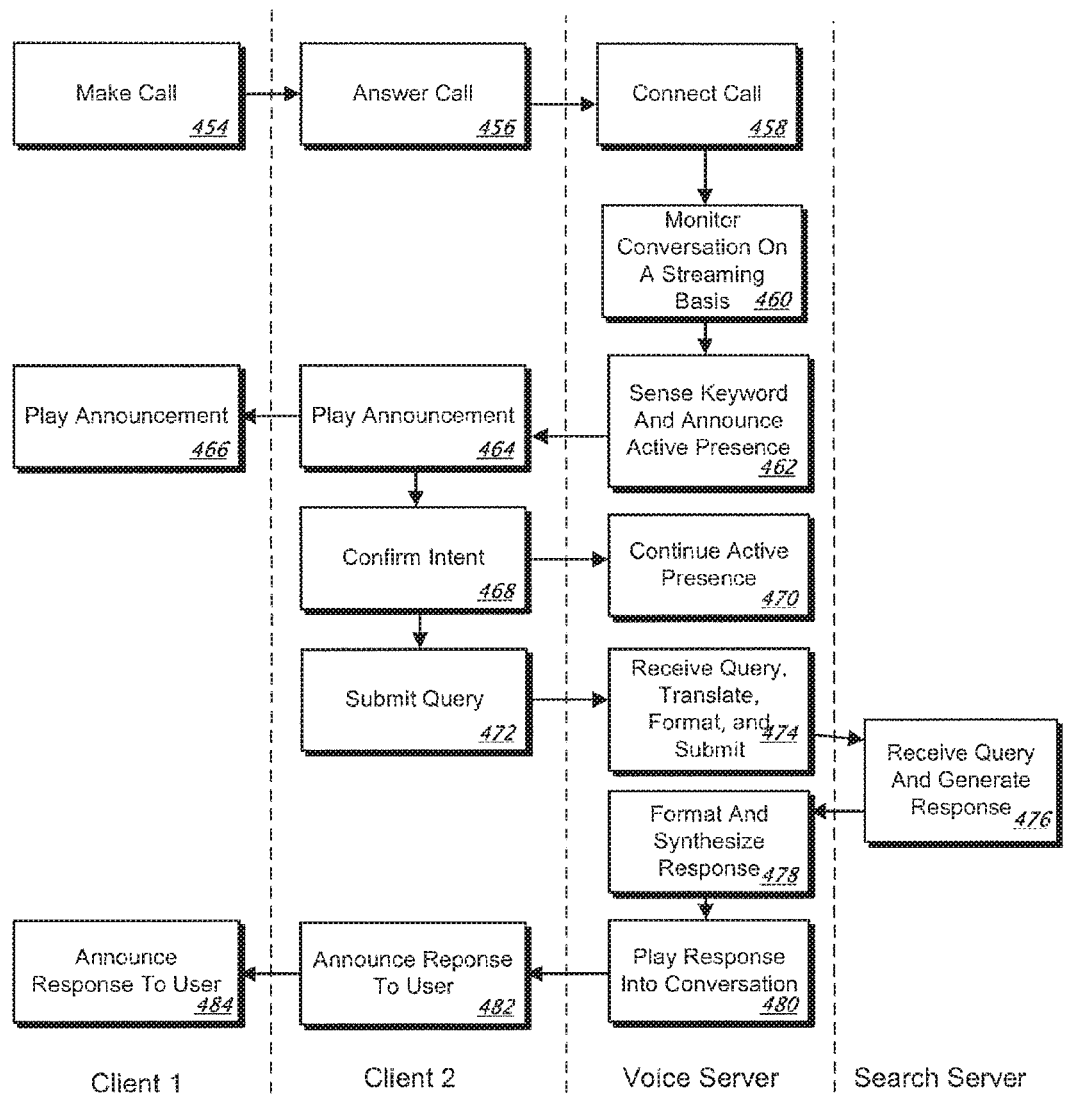

FIGS. 4B and 4C are swim lane diagrams of processes for providing search results as part of spoken electronic conversations. In general, the process of FIG. 4B shows general interaction where a voice server monitors a conversation passively, submits a participant-specified query to a search engine when a participant in the conversation indicates that they would like to obtain information from an in-line search server, and delivers the results of the search right into the conversation, using a synthesized voice that is inserted into the telephone call as if it came from an additional party to the call. A certain level of monitoring in this example occurs on a client device so as to help ensure privacy for the conversation.

The process begins at box 430, where a first user on Client 1 makes a comment that indicates an intent by the user to obtain search results, such as by the user stating a reserved term or pressing a reserved key on a telephone keypad. The Client 1 device does not support in-line search functionality, but the Client 2 device does, and it hears the reserved term over the telephone connection. As a result, it responds by verbally indicating that it is listening for a query to be submitted by one of the users who are taking part in the conversation (box 432). In this manner, the users are given notice when their conversation is being truly monitored. The response is stated by Client 2, and by the standard mechanism of the telephone connection, is transmitted to Client 1 (box 434).

Having received confirmation that Client 2 is waiting for submission of a query, the user of Client 1 speaks the query over the telephone connection (box 435), and Client 2 records a sound file of the query. In this example, Client 2 has functionality to recognize a reserved term, but is not powerful enough to perform more broad-ranging speech-to-text conversion. As a result, Client 2 is programmed to record the query provided via Client 1 (though the query could also come directly from the user of Client 2) and to submit an audio file of the query to Voice Server (box 436). The Voice Server is in turn programmed to extract and translate the file to text, and then format the query (box 438). For example, as discussed above, the Voice Server (which may also be in charge of carrying the call and relaying information spoken into Client 1, to Client 2, and vice-versa) may rearrange terms in the query or delete certain terms, in addition to selecting synonyms for terms submitted in the query, to produce a form of query that is formatted in a best manner for a search engine.

At box 440, the Voice Server submits the formatted query to a Search Server, which in turn receives the query and generates a response in an ordinary manner (box 442). In certain implementations, the Search Server may react to the query in the same manner that it would have if the query were submitted from a standard web page search. In other instances, the Search Server may be informed of the type of search that is needed, so that, for example, it would only returned formatted search results (e.g., in a ONEBOX format).

At box 444, the Voice Server receives the responses and synthesizes them back into speech. The Voice Server may also reformat the responses, such as to make them linear in a manner that they can be read, before the synthesis. At box 446, the Voice Server plays the result back into the communication channel, such as via a supervising operator connection into the communication channel, and the result is heard by users of Client 1 and Client 2 (boxes 446-450).

FIG. 4C is a swim lane diagram of a process that is similar to the process of FIG. 4B, but where the Voice Server passively and actively monitors a conversation, rather than one of the clients monitoring the conversation as in FIG. 4B. The process begins at box 454, where a user of a first client device makes a call. Substantially simultaneously, a user of a second client device answers the call and a Voice Sever connects the call (boxes 456, 458). The connection may include, for example, one or more VOIP segments.

With the call connected, the Voice Server carries the call and also monitors the call on a streaming basis, meaning that the server maintains data representing the content of the call only substantially long enough to determine whether a request has been made for the system to begin active monitoring. At box 462, the Voice Server senses such a term occurring in the conversation, and thus announces that it will be actively monitoring the conversation, by saving information about a query that is subsequently spoken so that the query can be submitted to a search engine (box 462). The announcement is then played in a normal manner on both client devices (boxes 464, 466), and the second user confirms that he or she would like active monitoring to proceed (box 468), so that the Voice Server continues its active presence on the telephone connection (box 470).

After confirming the intent to use the in-line search feature, the user of Client 2 speaks a query, which Client 2 submits to the Voice Server via the normal audio connections for the telephone call (box 472). As discussed above, the Voice Server receives the query, translates it into text, formats it in manners appropriate for a particular search engine, and submits the query to the Search Server (box 474), which returns a response to the query (box 476) in the form of one or more search results. The Voice Server them formats the search result or results into a form that is appropriate for verbal presentation and synthesizes such as presentation (box 478), which is then played over the voice connection for the call (box 480), and played naturally over both clients (boxes 484, 484).

Figure 5:
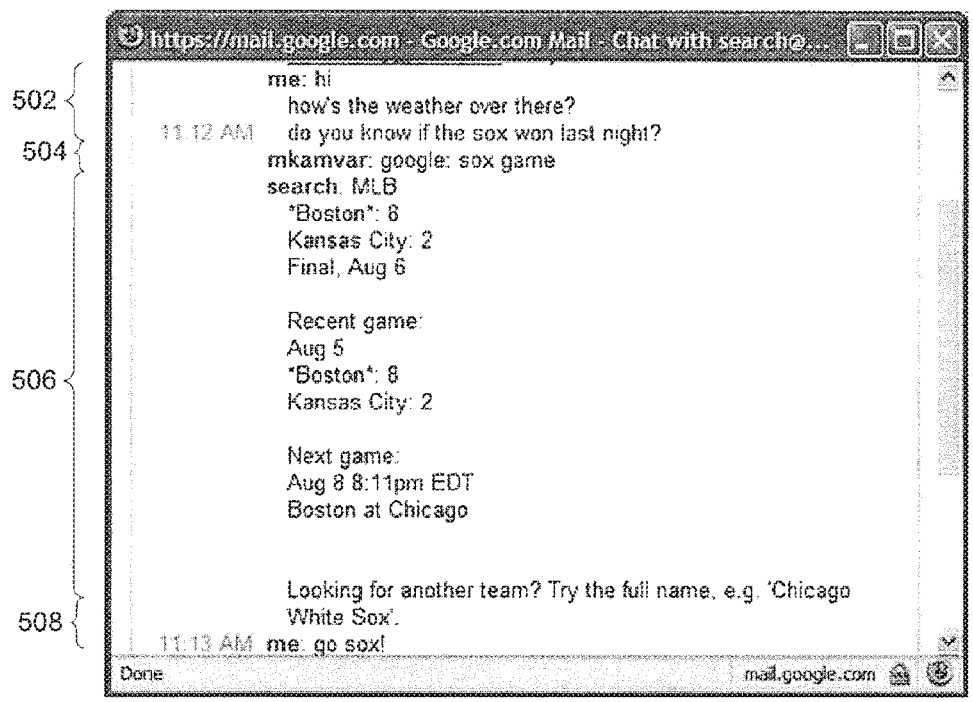
FIG. 5 is an example screen shot showing search results in-lined with a typed chat conversation.

FIG. 5 is an example screen shot showing search results in-lined with a typed chat conversation. In this example, the interface is a fairly basic chat interface that shows messages scrolling upward from the bottom of the display as new messages are added.

Message area 502 represents an opening question from the operator of the particular device to a friend with the screen handle of mkamvar, where the question includes an aspect pointing to the score of a baseball game from the prior night. Message area 504 shows mkamvar invoking in-line search functionality by first typing the reserved word "Google", and then typing the query "sox game." The system may then infer from that entry that the user is interested in information about a current sports score or new snippet, since few people say "Sox" and "game" together outside the content of professional baseball teams. (Such inference may be made simply by submitting the term "sox game" to a search engine.)

As shown in search result area 506, the system has made an assumption that Sox refers to the Boston Red Sox. The search engine thus returns scoring information for very recent Red Sox games. However, the system did sense some ambiguity in the query, vis-à-vis the Chicago White Sox, and thus provides, in a follow-up area 508 additional instructions to the user(s) for interacting with the in-line search server, such as to amend or refine a spoken query. The service could also make such a determination automatically, such as by obtaining information about a geographic location of one of the conversants (e.g., by GPS reading on a client device, by localizing an IP address received with a query, by looking at a user-specific information page, or by other known mechanisms).

In this manner, conversants in a chat session are able to receive information about many different topics, including baseball scores, right in the middle of their conversation. In the example, they did not need to launch another application or switch to another application such as a web browser in order to receive the information. In addition, the information was provided to all members of the conversation, so that one member did not have to repeated into the conversation information that they independently leanred outside the conversation.

Figure 6:
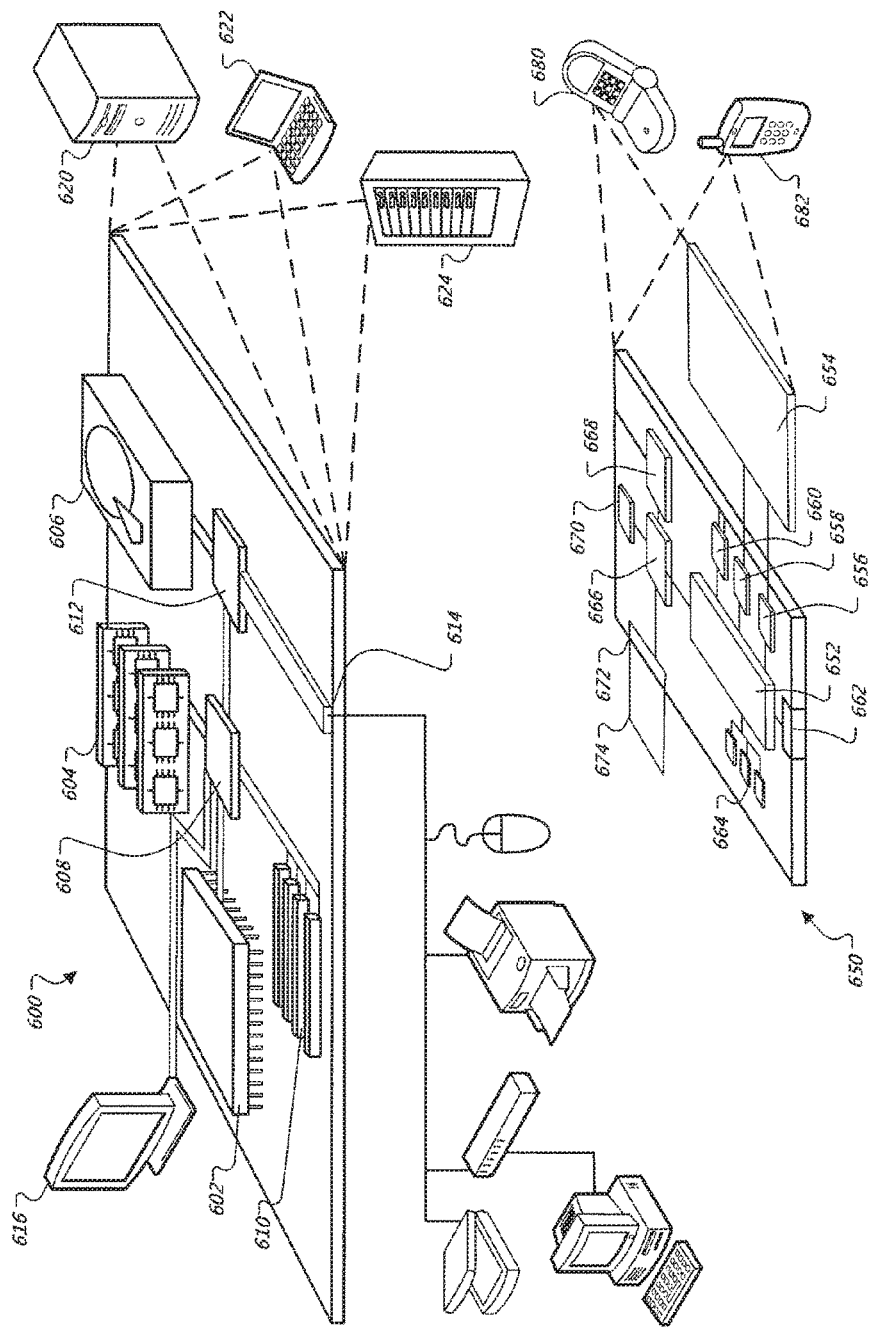
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to a telephone dialing application, but other forms of applications and keypad layouts may also be addressed, such as keypads involving graphical icons and macros, in addition to alphanumeric characters.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
during operation of a computing device in a passive monitoring mode:
receiving, at the computing device, a first voice input that comprises a particular reserved term and a first plurality of words subsequent to the particular reserved term, the computing device configured to identify a presence of the particular reserved term in voice inputs and unable to recognize any words in voice inputs while operating in the passive monitoring mode; and
determining, by the computing device, that the first voice input includes the particular reserved term;
in response to determining that the first voice input includes the particular reserved term, transitioning, by the computing device, from operation in the passive monitoring mode to operation in an active monitoring mode; and
during operation of the computing device in the active monitoring mode:
invoking, by the computing device, a speech-to-text converter to convert the first plurality of words of the first voice input to a first string of text, the computing device configured to transition back to the passive monitoring mode when no subsequent voice inputs are received within a predetermined period of time since transitioning to operation in the active monitoring mode;
submitting, by the computing device, the first string of text as a first query to a search server, the search server in communication with the computing device;
receiving, at the computing device, one or more first results related to the first query from the search service;
providing, by the computing device, the one or more first results as synthesized speech;
receiving, at the computing device, a second voice input comprising a second plurality of words, the second voice input not including the particular reserved term;
invoking, by the computing device, the speech-to-text converter to convert the second plurality of words of the second voice input to a second string of text; and
submitting, by the computing device, the second string of text as a second query to the search server.

2. The method of claim 1, further comprising:
transmitting, by the computing device, the first voice input to a voice server,
wherein the received first voice input comprising the first plurality of words is received from the voice server.

3. The method of claim 1, further comprising, during operation of the computing device in the passive monitoring mode:
sensing an occurrence of the particular reserved term; and
in response to sensing the occurrence of the particular reserved term, announcing that operation of the computing device in the active monitoring mode will begin.

4. The method of claim 1, where determining that the first plurality of words includes the particular reserved term comprises comparing hashed information from the first plurality of words to a hashed version of the particular reserved term.

5. The method of claim 1, wherein the particular reserved term comprises a name of a particular service.

6. The method of claim 5, wherein the first query is formatted for the particular service.

7. The method of claim 1, wherein the one or more first results related to the first query are received along with a handle that identifies the one or more first results related to the first query as coming from a service corresponding to the handle.

8. The method of claim 1, wherein the one or more first results related to the first query are provided to a user of the computing device in a conversational format.

9. A system comprising:
one or more computer processors; and
one or more non-transitory computer readable devices that include instructions that, when executed by the one or more computer processors, causes the processors to perform operations, the operations comprising:
during operation of a computing device in a passive monitoring mode:
receiving a first voice input that comprises a particular reserved term and a first plurality of words subsequent to the particular reserved term, the computing device configured to identify a presence of the particular reserved term in voice inputs and unable to recognize any words in voice inputs while operating in the passive monitoring mode; and
determining that the first voice input includes the particular reserved term;
in response to determining that the first voice input includes the particular reserved term, transitioning from operation in the passive monitoring mode to operation in an active monitoring mode; and
during operation of the computing device in the active monitoring mode:
invoking a speech-to-text converter to convert the first plurality of words of the first voice input to a first string of text, the computing device configured to transition back to the passive monitoring mode when no subsequent voice inputs are received within a predetermined period of time since transitioning to operation in the active monitoring mode;
submitting the first string of text as a first query to a search server, the search server in communication with the computing device;
receiving one or more first results related to the first query from the search service;
providing the one or more first results as synthesized speech;
receiving a second voice input comprising a second plurality of words, the second voice input not including the particular reserved term;
invoking the speech-to-text converter to convert the second plurality of words of the second voice input to a second string of text; and
submitting the second string of text as a second query to the search server.

10. The system of claim 9, wherein the operations further comprise:
transmitting the first voice input to a voice server, wherein the received first voice input comprising the first plurality of words is received from the voice server.

11. The system of claim 9, wherein the operations further comprise, during operation of the computing device in the passive monitoring mode:
sensing an occurrence of the particular reserved term; and
in response to sensing the occurrence of the particular reserved term, announcing that operation of the computing device in the active monitoring mode will begin.

12. The system of claim 9, where determining that the first plurality of words includes the particular reserved term comprises comparing hashed information from the first plurality of words to a hashed version of the particular reserved term.

13. The system of claim 9, wherein the particular reserved term comprises a name of a particular service.

14. The system of claim 13, wherein the first query is formatted for the particular service.

15. The system of claim 9, wherein the one or more first results related to the first query are received along with a handle that identifies the one or more first results related to the first query as coming from a service corresponding to the handle.

16. The system of claim 9, wherein the one or more first results related to the first query are provided to a user of the computing device in a conversational format.

17. A non-transitory computer accessible media storing instructions that, when executed by a processor, perform operations comprising:
during operation of a computing device in a passive monitoring mode:
receiving a first voice input that comprises a particular reserved term and a first plurality of words subsequent to the particular reserved term, the computing device configured to identify a presence of the particular reserved term in voice inputs and unable to recognize any words in voice inputs while operating in the passive monitoring mode; and
determining that the first voice input includes the particular reserved term;
in response to determining that the first voice input includes the particular reserved term, transitioning from operation in the passive monitoring mode to operation in an active monitoring mode; and
during operation of the computing device in the active monitoring mode:
invoking a speech-to-text converter to convert the first plurality of words of the first voice input to a first string of text, the computing device configured to transition back to the passive monitoring mode when no subsequent voice inputs are received within a predetermined period of time since transitioning to operation in the active monitoring mode;
submitting the first string of text as a first query to a search server, the search server in communication with the computing device;
receiving one or more first results related to the first query from the search service;
providing the one or more first results as synthesized speech;
receiving a second voice input comprising a second plurality of words, the second voice input not including the particular reserved term;
invoking the speech-to-text converter to convert the second plurality of words of the second voice input to a second string of text; and
submitting the second string of text as a second query to the search server.

* * * * *